US009785817B2

(12) United States Patent
Gagliano

(10) Patent No.: US 9,785,817 B2
(45) Date of Patent: Oct. 10, 2017

(54) REGION OF INTEREST LOCATION AND SELECTIVE IMAGE COMPRESSION

(71) Applicant: DATALOGIC USA, INC., Eugene, OR (US)

(72) Inventor: Jeffrey A. Gagliano, Pennsburg, PA (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 14/725,544

(22) Filed: May 29, 2015

(65) Prior Publication Data
US 2016/0350569 A1 Dec. 1, 2016

(51) Int. Cl.
G06K 19/06 (2006.01)
G06K 7/14 (2006.01)
G06K 9/32 (2006.01)
H04N 1/00 (2006.01)
G06K 7/10 (2006.01)

(52) U.S. Cl.
CPC ....... *G06K 7/1495* (2013.01); *G06K 7/10732* (2013.01); *G06K 7/10821* (2013.01); *G06K 7/1413* (2013.01); *G06K 7/1417* (2013.01); *G06K 9/3233* (2013.01); *H04N 1/00* (2013.01)

(58) Field of Classification Search
CPC .. G06K 7/1795; G06K 7/1413; G06K 7/1417; G06K 7/1404; G06K 7/10732; G06K 7/10821; G06K 9/3233
USPC .................................................. 235/462.01
See application file for complete search history.

(56) References Cited

U.S. PATENT DOCUMENTS

| 5,524,068 A * | 6/1996 | Kacandes ................ G06K 7/14 382/103 |
| 6,377,698 B1 | 4/2002 | Cumoli et al. |
| 7,181,066 B1 | 2/2007 | Wagman et al. |
| 7,817,859 B2 | 10/2010 | Lee |
| 2003/0198383 A1* | 10/2003 | Yamaguchi .............. G06K 7/14 382/183 |
| 2007/0228171 A1 | 10/2007 | Thiyagarajah |

(Continued)

OTHER PUBLICATIONS

Chen et al., "A double-threshold image binarization method based on edge detector," *Pattern Recognition* 41:1254-1267, 2008.

(Continued)

*Primary Examiner* — Laura Gudorf
(74) *Attorney, Agent, or Firm* — Seed IP Law Group LLP

(57) ABSTRACT

Systems and methods of operation for an image processor system to process images to locate two-dimensional regions which are likely to contain machine-readable symbol data or text. Such regions of interest (ROIs) may be preserved at full resolution, while the contents of non-ROIs are averaged into a single pixel value. Transition densities in an image may be converted into a numeric value. Such transition densities may be indicative of the presence of data of interest, such as textual data and/or machine-readable symbol data. The pixels values for the pixels in the ROIs may be sent to a decoder unchanged (i.e., full resolution), which absolves the decoder from having to perform any ROI location computations. Modified or altered images may be compressed to much smaller size files while maintaining lossless ROIs, which allows for transmission of such images to processor-based devices over a data communications channel in real time.

31 Claims, 12 Drawing Sheets

(56) References Cited

U.S. PATENT DOCUMENTS

2009/0022403 A1* 1/2009 Takamori .............. G06T 7/2006
 382/195
2014/0291401 A1* 10/2014 Nakamura ........... G06K 7/1443
 235/462.08

OTHER PUBLICATIONS

Shapiro et al., "Chapter 5: Filtering and Enhancing Images," in *Computer Vision*: 2000, 60 pages.
Bhatnagar et al., "Selective image encryption based on pixels of interest and singular value decomposition," *Digital Signal Processing* 22:648-663, 2012.
Bovik et al., "3.1: Basic Linear Filtering with Application to Image Enhancement," in Bovik, (ed.) *Handbook of mage and Video Processing*, Academic Press, 2000, pp. 71-79.
Extended European Search Report dated Oct. 18, 2016, for corresponding EP Application No. 16169207.4-1901, 10 pages.
Karvonen et al., "A Wavelet Transform Coder Supporting Browsing and Transmission of Sea Ice SAR Imagery," *IEEE Transactions on Geoscience and Remote Sensing* 40(11):2464-2485, Nov. 2002.
Maragos et al., "3.3: Morphological Filtering for Image Enhancement and Detection," in Bovik, (ed.) *Handbook of Image and Video Processing*, Academic Press, 2000, pp. 101-116.

\* cited by examiner

REGION OF INTEREST LOCATION AND SELECTIVE IMAGE COMPRESSION

BACKGROUND

Technical Field

The present disclosure generally relates to image processing and compression.

Description of the Related Art

Machine-readable symbols encode information in a form that can be optically read via a machine-readable symbol reader or scanner. Machine-readable symbols take a variety of forms, the most commonly recognized form being the linear or one-dimensional machine-readable symbol. Other forms include two-dimensional machine-readable symbols such as stacked code symbols, area or matrix code symbols, or machine-readable symbols. These machine-readable symbols may be made of patterns of high and low reflectance areas. For instance, a one-dimensional barcode symbol may comprise a pattern of black bars on a white background. Also for instance, a two-dimensional symbol may comprise a pattern of black marks (e.g., bars, squares or hexagons) on a white background. Machine-readable symbols are not limited to being black and white, but may comprise two other colors, and/or may include more than two colors (e.g., more than black and white).

Machine-readable symbols are typically composed of elements (e.g., symbol characters) which are selected from a particular machine-readable symbology. Information is encoded in the particular sequence of shapes (e.g., bars) and spaces which may have varying dimensions. The machine-readable symbology provides a mapping between machine-readable symbols or symbol characters and human-readable symbols (e.g., alpha, numeric, punctuation, commands). A large number of symbologies have been developed and are in use, for example Universal Product Code (UPC), International Article Number (EAN), Code 39, Code 128, Data Matrix, PDF417, etc.

Machine-readable symbols have widespread and varied applications. For example, machine-readable symbols can be used to identify a class of objects (e.g., merchandise) or unique objects (e.g., patents). As a result, machine-readable symbols are found on a wide variety of objects, such as retail goods, company assets, and documents, and help track production at manufacturing facilities and inventory at stores (e.g., by scanning objects as they arrive and as they are sold). In addition, machine-readable symbols may appear on a display of a portable electronic device, such as a mobile telephone, personal digital assistant, tablet computer, laptop computer, or other device having an electronic display. For example, a customer, such as a shopper, airline passenger, or person attending a sporting event or theater event, may cause a machine-readable symbol to be displayed on their portable electronic device so that an employee (e.g., merchant-employee) can read the machine-readable symbol via a machine-readable symbol reader to allow the customer to redeem a coupon or to verify that the customer has purchased a ticket for the event.

Machine-readable symbol readers or scanners are used to capture images or representations of machine-readable symbols appearing on various surfaces to read the information encoded in the machine-readable symbol. One commonly used machine-readable symbol reader is an imager- or imaging-based machine-readable symbol reader. Imaging-based machine-readable symbol readers typically employ flood illumination to simultaneously illuminate the entire machine-readable symbol, either from dedicated light sources, or in some instances using ambient light. Such is in contrast to scanning or laser-based (i.e., flying spot) type machine-readable symbol readers, which scan a relative narrow beam or spot of light sequentially across the machine-readable symbol.

Machine-readable symbol readers may be fixed, for example, readers may be commonly found at supermarket checkout stands or other point of sale locations. Machine-readable symbol readers may also be handheld (e.g., handheld readers or even smartphones), or mobile (e.g., mounted on a vehicle such as a lift vehicle or a forklift).

Imaging-based machine-readable symbol readers typically include solid-state image circuitry, such as charge-coupled devices (CCDs) or complementary metal-oxide semiconductor (CMOS) devices, and may be implemented using a one-dimensional or two-dimensional imaging array of photosensors (or pixels) to capture an image of the machine-readable symbol. One-dimensional CCD or CMOS readers capture a linear cross-section of the machine-readable symbol, producing an analog waveform whose amplitude represents the relative darkness and lightness of the machine-readable symbol. Two-dimensional CCD or CMOS readers may capture an entire two-dimensional image. The image is then processed to find and decode a machine-readable symbol. For example, virtual scan line techniques for digitally processing an image containing a machine-readable symbol sample across an image along a plurality of lines, typically spaced apart and at various angles, somewhat like a scan pattern of a laser beam in a scanning or laser-based scanner.

Images captured by imaging-based readers or cameras are often acquired at a high resolution and are therefore relatively large. Thus, sending images from the camera to other processor-based devices in substantially real-time over a data communications channel (e.g., LAN, WAN) can be difficult or impossible. Various techniques have been used to address this problem. These techniques include utilizing one or more of image decimation (e.g., down sampling), image cropping and image compression (e.g., jpeg conversion) prior to transmission. However, using these techniques has disadvantages due to the loss of information in the images. For instance, JPEG conversion, while providing a reasonable representation of the original image, still destroys potentially important information in the image, such as binarized data encoded in the pixel least significant bit (LSB), which may be used for optical character recognition (OCR), or embedded data typically placed in the scan line which provides information regarding camera operation relating to the image being acquired. Further, image cropping is not always reliable as part of the object or data of interest may be cropped. Cropping may also remove the aforementioned embedded data in images.

Additionally, known decoding software employs software modules which function to locate regions of interest (ROIs) for machine-readable symbol decoding. Such functions are computationally intensive, and such functions do not assist in compression of the images.

BRIEF SUMMARY

A method of operation for an image processor system may be summarized as including receiving, by at least one processor, an original image file from at least one nontransitory processor-readable medium, the original image file comprising a two dimensional array of pixels, each of the pixels having an original pixel value; partitioning, by the at least one processor, the original image file into a plurality of two dimensional regions, each of the plurality of regions comprising a two dimensional array of the pixels; binarizing, by the at least one processor, the original image file to generate a binarized image file comprising a two dimensional array of binarized pixels, each of the binarized pixels having a binarized pixel value; correlating, by the at least one processor, each of the binarized pixels in the binarized image file by, for each binarized pixel, evaluating a binarization state of at least one neighboring pixel; identifying, by the at least one processor, which of the binarized pixels in the binarized image have a correlation value above a correlation threshold; generating, by the at least one processor, a region correlation array comprising a plurality of region correlation values, each region correlation value corresponding to one of the plurality of regions and indicative of the number of binarized pixels in the corresponding region identified as having a correlation value above the correlation threshold; for each region, comparing, by the at least one processor, the region correlation value with a region of interest threshold; and identifying, by the at least one processor, the region as a region of interest if the region correlation value is above the region of interest threshold. Binarizing the original image file may include implementing an edge detection algorithm to generate a binarized image file including a two dimensional array of binarized pixels, each of the binarized pixels having a binarized pixel value indicative of whether the binarized pixel has been classified as an edge by the edge detection algorithm.

The method may further include blurring, by the at least one processor, the region correlation array using a convolution operation to generate a blurred region correlation array comprising a plurality of blurred region correlation values; wherein, for each region, comparing the region correlation value with a region of interest threshold comprises comparing the blurred region correlation value with a region of interest threshold; and identifying the region as a region of interest if the region correlation value is above the region of interest threshold comprises identifying the region as a region of interest if the blurred region correlation value is above the region of interest threshold.

The method may further include responsive to identifying the region as a region of interest, identifying, by the at least one processor, each region adjacent the region as a region of interest.

The method may further include computing, by the at least one processor, a region average pixel value for each of a plurality of non-regions of interest, each non-region of interest being one of the regions of the original image file not identified as a region of interest; for each pixel in a non-region of interest, setting, by the at least one processor, the pixel value to the computed region average pixel value for the region of which the pixel is a part to generate a modified image file; and storing, by the at least one processor, the modified image file in the at least one nontransitory processor-readable medium.

The method may further include sending, by the at least one processor, the modified image file to a decoder for decoding of the modified image file.

The method may further include decoding, by the at least one processor, the modified image file.

The method may further include compressing, by the at least one processor, the modified image file to generate a compressed modified image file.

The method may further include sending, by the at least one processor, the compressed modified image file to a processor-based device over at least one data communication channel.

Compressing the modified image file may include, for each non-region of interest of the original image file, storing, by the at least one processor, a single pixel value for all of the pixels in the non-region of interest.

An image processor system may be summarized as including at least one processor; at least one nontransitory processor-readable storage medium operatively coupled to the at least one processor which stores an original image file comprising a two dimensional array of pixels, each of the pixels having an original pixel value, the at least one nontransitory processor-readable medium further storing at least one of data or instructions which, when executed by the at least one processor, cause the at least one processor to: partition the original image file into a plurality of two dimensional regions, each of the plurality of regions comprising a two dimensional array of the pixels; identify one or more regions of interest in the original image file, the one or more regions of interest comprising one or more regions wherein data of interest are likely to be found; compute a region average pixel value for each of a plurality of non-regions of interest, each non-region of interest being one of the regions of the original image file not identified as a region of interest; for each pixel in a non-region of interest, set the pixel value to the computed region average pixel value for the region of which the pixel is a part to generate a modified image file; and store the modified image file in the at least one nontransitory processor-readable medium.

The at least one processor may binarize the original image file to generate a binarized image file comprising a two dimensional array of binarized pixels, each of the binarized pixels having a binarized pixel value; correlate each of the binarized pixels; identify which of the binarized pixels have a correlation value above a correlation threshold; and generate a region correlation array comprising a plurality of region correlation values, each region correlation value corresponding to one of the plurality of regions and indicative of the number of binarized pixels in the corresponding region identified as having a correlation value above the correlation threshold. The at least one processor may, for each of the binarized pixels, evaluate a binarization state of at least one neighboring pixel to correlate the binarized pixel. The at least one processor may blur the region correlation array using a convolution operation to generate a blurred region correlation array of blurred region correlation values. The at least one processor may, for each region, compare the region correlation value with a region of interest threshold; and identify the region as a region of interest if the region correlation value is above the region of interest threshold. The at least one processor may, for each region in which the region correlation value is above the region of interest threshold, identify each region adjacent the region as a region of interest. The data of interest may include at least one of text or a machine-readable symbol. The at least one processor may send the modified image file to a decoder for decoding of the data of interest present in the modified image file. The at least one processor may decode the data of interest present in the modified image file. The at least one processor may compress the modified image file to generate a compressed modified image file. The at least one processor may send the compressed modified image file to a processor-based device over at least one data communication channel. The at least one processor may, for each non-region of interest of the original image file, store a single pixel value for all of the pixels in the non-region of interest. The at least one processor may send the modified image file to a processor-based device via at least one data communication channel.

A method of operation for an image processor system may be summarized as including receiving, by at least one processor, an original image file from at least one nontransitory processor-readable medium, the original image file comprising a two dimensional array of pixels, each of the pixels having an original pixel value; partitioning, by the at least one processor, the original image file into a plurality of two dimensional regions, each of the plurality of regions comprising a two dimensional array of the pixels; identifying, by the at least one processor, one or more regions of interest in the original image file, the one or more regions of interest comprising one or more regions wherein data of interest are likely to be found; computing, by the at least one processor, a region average pixel value for each of a plurality of non-regions of interest, each non-region of interest being one of the regions of the original image file not identified as a region of interest; for each pixel in a non-region of interest, setting, by the at least one processor, the pixel value to the computed region average pixel value for the region of which the pixel is a part to generate a modified image file; and storing, by the at least one processor, the modified image file in the at least one nontransitory processor-readable medium.

Identifying one or more regions of interest in the original image file may include binarizing, by the at least one processor, the original image file to generate a binarized image file comprising a two dimensional array of binarized pixels, each of the binarized pixels having a binarized pixel value; correlating, by the at least one processor, each of the binarized pixels; identifying, by the at least one processor, which of the binarized pixels have a correlation value above a correlation threshold; and generating, by the at least one processor, a region correlation array comprising a plurality of region correlation values, each region correlation value corresponding to one of the plurality of regions and indicative of the number of binarized pixels in the corresponding region identified as having a correlation value above the correlation threshold. Correlating each of the binarized pixels may include, for each of the binarized pixels, evaluating, by the at least one processor, a binarization state of at least one neighboring pixel. Identifying one or more regions of interest in the original image file may include blurring, by the at least one processor, the region correlation array using a convolution operation to generate a blurred region correlation array of blurred region correlation values. Identifying one or more regions of interest in the original image file may include, for each region, comparing, by the at least one processor, the region correlation value with a region of interest threshold; and identifying, by the at least one processor, the region as a region of interest if the region correlation value is above the region of interest threshold. Identifying one or more regions of interest in the original image file may include, for each region in which the region correlation value is above the region of interest threshold, identifying, by the at least one processor, each region adjacent the region as a region of interest. Identifying one or more regions of interest in the original image file may include identifying, by the at least one processor, one or more regions of interest comprising one or more regions wherein data of interest are likely to be found, and the data of interest comprises at least one of text or a machine-readable symbol.

The method may further include sending, by the at least one processor, the modified image file to a decoder for decoding of the data of interest present in the modified image file.

The method may further include decoding, by the at least one processor, the data of interest present in the modified image file.

The method may further include compressing, by the at least one processor, the modified image file to generate a compressed modified image file.

The method may further include sending, by the at least one processor, the compressed modified image file to a processor-based device over at least one data communication channel. Compressing the modified image file may include, for each non-region of interest of the original image file, storing, by the at least one processor, a single pixel value for all of the pixels in the non-region of interest.

The method may further include sending, by the at least one processor, the modified image file to a processor-based device via at least one data communication channel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

Figure 1:
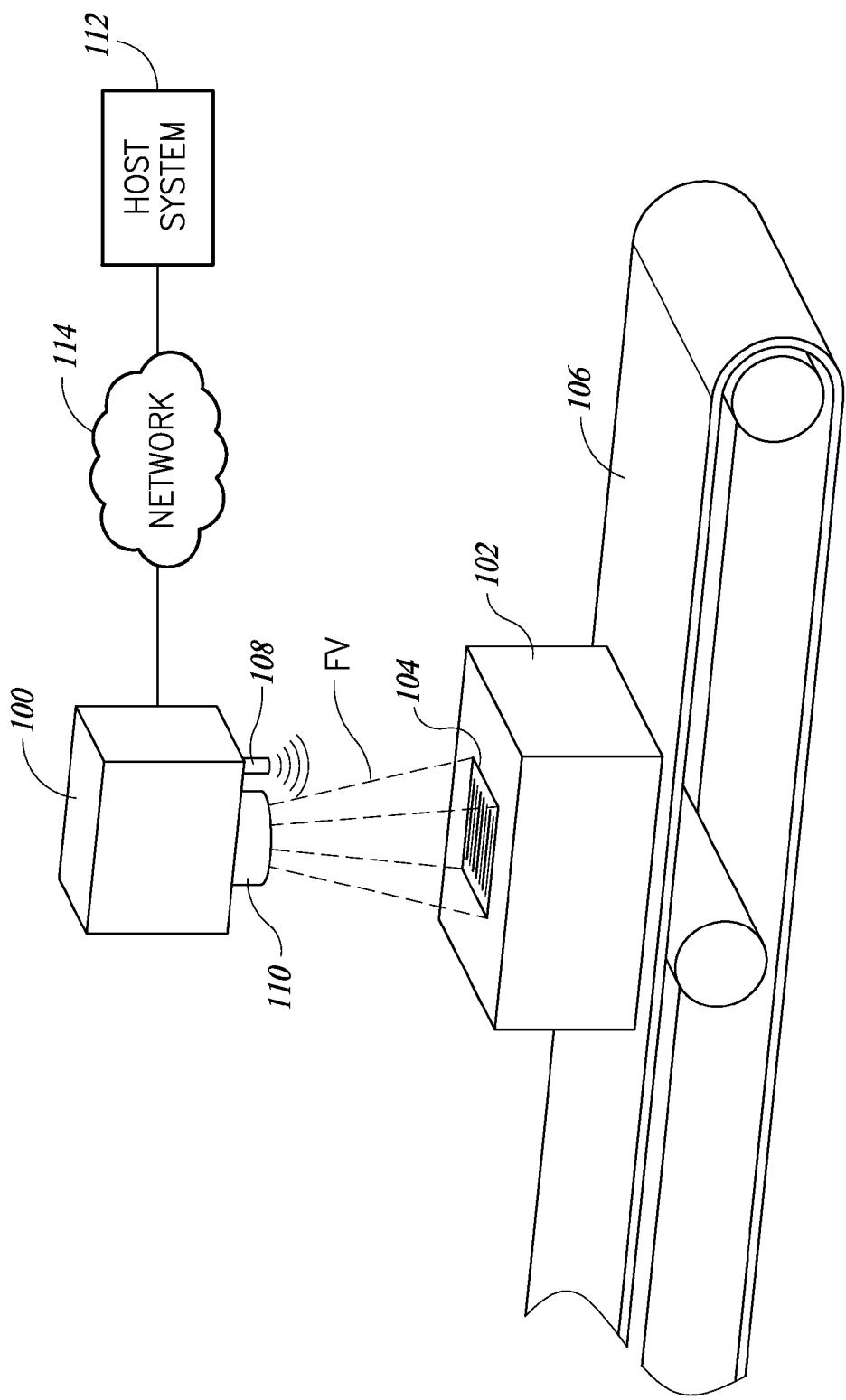
FIG. 1 is a perspective view of a machine-readable symbol reader and target object, according to one illustrated implementation.

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the implementations.

Implementations of the present disclosure are directed to systems and methods for processing video or image data to locate and preserve two dimensional regions of an image which are likely to contain machine-readable symbol data or text, referred to herein as regions of interest (ROIs), whilst averaging the contents of those regions which are not likely to contain machine-readable symbol data or text, referred to herein as non-ROIs, into a single pixel value. For example, in some implementations, transition densities in an image are converted into a numeric value. Such transition densities may be indicative of the presence of data of interest, such as textual data and/or machine-readable symbol data. The pixel values for the pixels in the ROIs may be sent to a decoder unchanged (i.e., at their full resolution). This feature absolves the decoder from having to perform any ROI computations.

In some implementations, modified or altered images may be compressed using a standard compression technique, such as JPEG conversion. In some implementations, an altered image may be selectively compressed because each of the non-ROIs may be defined by a single value (e.g., one byte). In instances where regions are 16×16 pixels, for example, each non-ROI allows for a 99.6% compression ratio since the pixel values for all 256 pixels in the non-ROI may be represented by the single value. In these implementations, the pixel values of the pixels in the ROIs are preserved, along with any embedded data, without loss. As discussed further below with reference to FIG. 8, such compression may be achieved by creating a bit-wise map of the image indicating which regions are ROIs and which regions are non-ROIs. Using this scheme, images may be compressed while maintaining lossless ROIs. It should be appreciated that this second compression implementation may require custom decompression software on processor-based devices which need to decompress such images.

Using the systems and methods disclosed herein, images may be compressed to a much smaller size, which allows for transmission of such images to users over a data communications channel with the ROIs preserved at their full resolution, while not consuming a large amount of bandwidth transmitting non-ROI portions at their full resolution.

FIG. 1 shows a machine-readable symbol reader 100 acting upon a target object 102 labeled with a machine-readable symbol 104. The reader or scanner 100 may be an imaging based machine-readable symbol reader (e.g., camera). In use, the target object 102 having the machine-readable symbol 104 may be brought within a field of view (FV) of the machine-readable symbol reader via a conveyor 106 to have the reader 100 read or detect the machine-readable symbol 104.

In some implementations, the machine-readable symbol reader 100 may include a flood illumination system 108 to illuminate the target machine-readable symbol 104. The flood illumination system 108 may direct a flood illumination pattern towards the target machine-readable symbol 104. The illumination from the flood illumination system 108 may be reflected by the target machine-readable symbol 104. The reflected light then passes through an imaging system 110 of the reader 100 (see FIG. 2).

The machine-readable symbol reader 100 may be communicatively coupled to one or more externals systems, such as a host system 112, via one or more wired and/or wireless communications networks 114 (e.g., intranet, Internet). The machine-readable symbol reader 100 may send images and/or data (e.g., decoded machine-readable symbol data) to the one or more external systems 112 via the one or more networks 114. The machine-readable symbol reader 100 may also receive at least one of instructions or data from the one or more external systems 112, such as configuration instructions or data, via the one or more networks 114.

Figure 2:
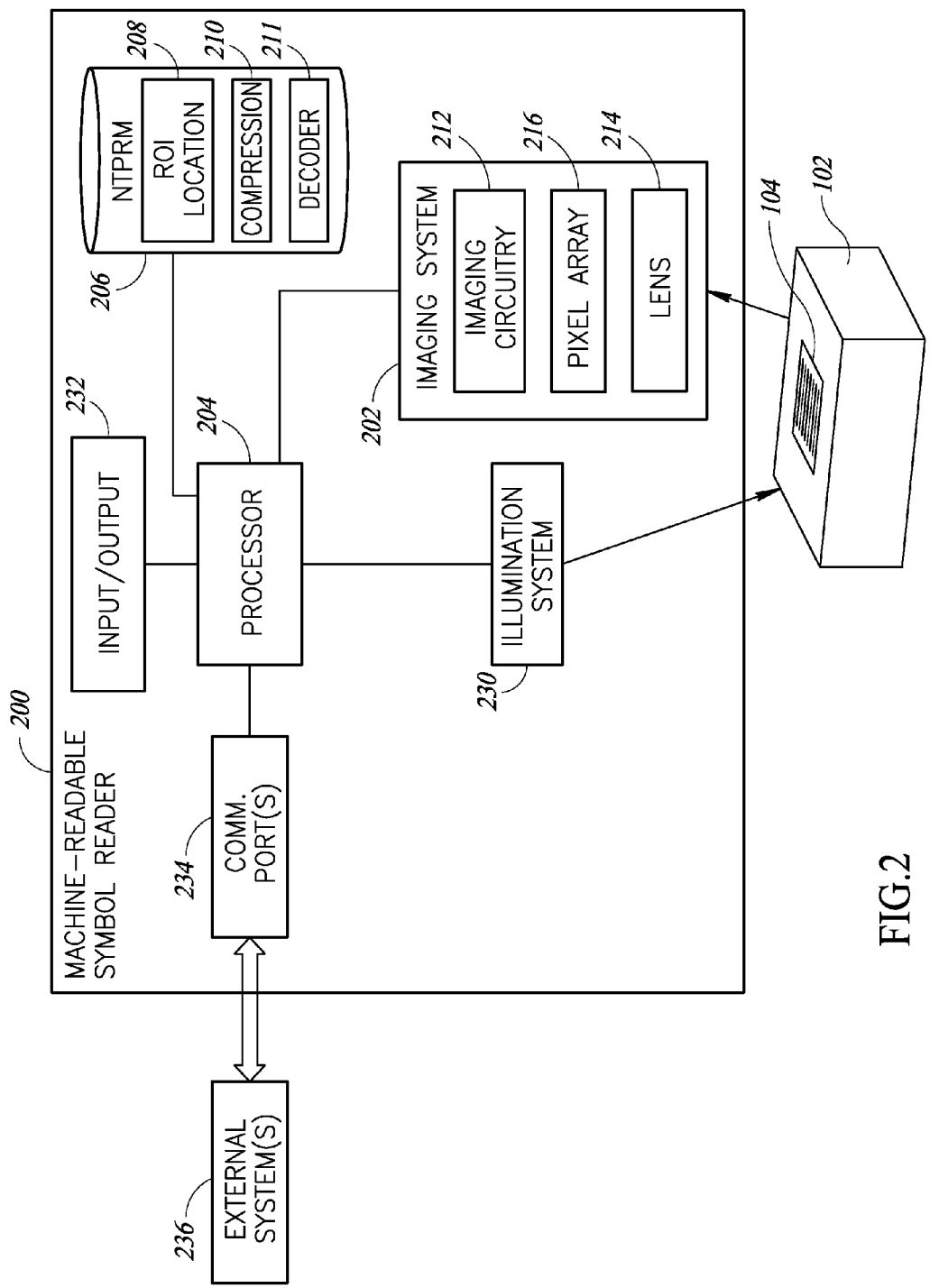
FIG. 2 is a functional block diagram of a machine-readable symbol reader, according to one illustrated implementation.

FIG. 2 is a block diagram of an imaging based machine-readable symbol reader 200 in accordance with some implementations of the present disclosure. The machine-readable symbol reader 200 may be similar or identical to the machine-readable symbol reader 100 of FIG. 1. The machine-readable symbol reader 200 includes an imaging system 202 which captures image frames of graphical indicia such as the machine-readable symbol 104 of FIG. 1 present in the field of view (FV) of the imaging system 202. The reader 200 also includes one or more processors 204 operatively coupled to a nontransitory processor-readable medium 206 which stores ROI location logic 208, compression logic 210 and decoder logic 211. The decoder logic 211 decodes encoded indicia within a captured image frame. For example, the decoder logic 211 may be operative to decode various symbols and/or text, such as, Aztec, Codabar, Code 11, Code 128, Code 39, Code 93, Data Matrix, Postal, UPC, etc. The ROI location logic 208, compression logic 210 and decoder logic 211 may be executed by the processor 204, for example. In some implementations, one or more of the ROI location logic 208, compression logic 210 and decoder logic 211 are implemented by multiple processors, by hardware, or by any combination thereof.

The imaging system 202 includes imaging circuitry 212, focusing optics including one or more imaging or focusing lens 214, and a photo sensor or pixel array 216. The focusing lens 214 focuses light reflected and scattered from the target machine-readable symbol 104 through an aperture onto the pixel/photo sensor array 216. Thus, the lens 214 focuses an image of the target machine-readable symbol 104 (assuming the watermark is within the FV) onto the array of pixels comprising the pixel array 216, thereby enabling the pixel array to capture an image of a target object 102 within a FV of the imaging system during an exposure period. The FV of the imaging system 202 includes both a horizontal and a vertical field of view. The FV of the imaging system 202 may be a function of both the configuration of the sensor array 216 and the optical characteristics of the imaging lens 214 and the distance and orientation between the array 216 and the imaging lens.

The sensor array 216 may include a charged coupled device (CCD), a complementary metal oxide semiconductor (CMOS), or other imaging pixel array, operating under the control of the imaging circuitry 212. The sensor array 216 may have various width and height dimensions in pixels, such as 640×480 pixels, 752×480 pixels, 1280×1024 pixels, 1600×1200, 8192×1 (e.g., high speed linear array), other combinations of width and height dimensions, or any sub-windows thereof.

In some implementations, the machine-readable symbol reader 200 may include a flood illumination system 230 to illuminate the target machine-readable symbol 104. The flood illumination system 230 may direct a flood illumination pattern towards the target machine-readable symbol 104. The illumination from the flood illumination system 230 may be reflected by the target machine-readable symbol 104. The reflected light then passes through the imaging lens 214 and is focused onto the sensor array 216 of the imaging system 202.

As discussed further below, the decoder logic 210 may decode any decodable image within one or more images captured by the imaging system 202. If the decoding is successful, decoded data, representative of the data/information coded in the machine-readable symbol 104, may then output via a data input/output system 232, which may include one or more of a display, LEDs, an audio output, touchscreen, keys, buttons, etc. Upon a successful imaging and decoding of the machine-readable symbol 104, the input/output system 232 may provide feedback to the operator in the form of a visual indicator and/or an audible indicator.

The reader 200 may also include one or more wired and/or wireless communications ports 234 which communicatively couple the reader to one or more external systems 236, such as the host system 112 shown in FIG. 1, via one or more suitable wired/wireless communications networks or channels. The reader 200 may send images and or data to the external systems 236, as discussed further below.

The ROI location logic 208, compression logic 210 and decoder logic 211 may be implemented in any suitable manner, including hardware, software, electrical circuitry, firmware, on an application specific integrated circuit (ASIC), on a programmable gate array (PGA), or any combination thereof. Particular algorithms for implementing the ROI location logic 208, compression logic 210 and decoder logic 211 are discussed below with reference to FIGS. 3-16.

Figure 3:
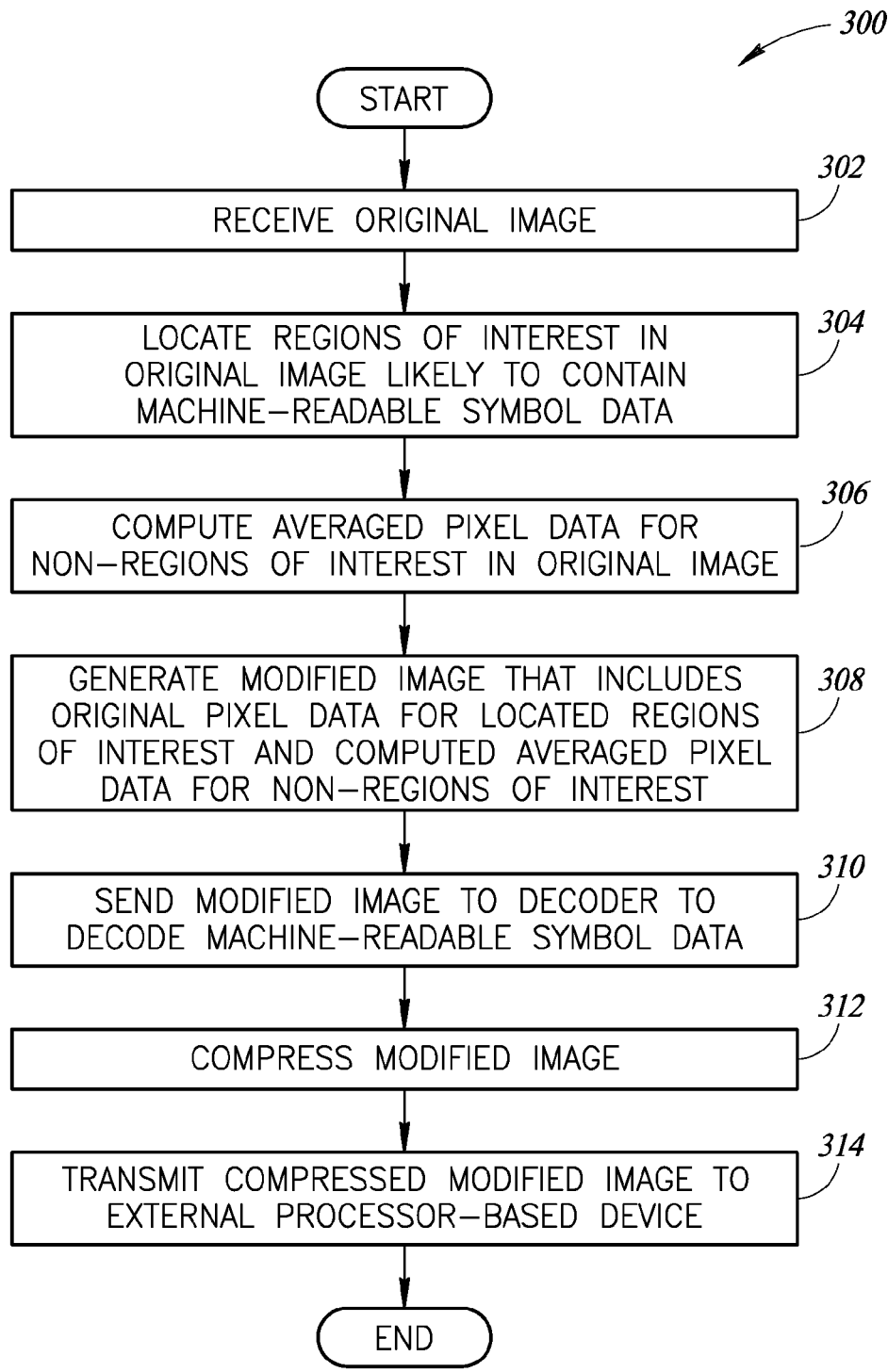
FIG. 3 is a flow diagram of a high-level method of operation for an image processor system, according to one illustrated implementation.

FIG. 3 is a flow diagram of a high-level method 300 for an image processor system which facilitates both improved decoding times and improved levels of compression. The method 300 may be executed by a machine-readable symbol reader, such as the machine-readable symbol readers 100 and 200 of FIGS. 1 and 2, respectively.

At 302, at least one processor of the reader receives an original image which captures at least one machine-readable symbol. For example, the at least one processor of the reader may receive the original image from an imaging subsystem of the reader. The original image may include a two-dimensional array of pixels, such as an array having a width of 8192 pixels and a height of 8192 pixels, which provides a total of 67,108,864 pixels. Such an image may be obtained by accumulating line by line the output of a 8192×1 linear array, acquired in a temporal sequence while an object is moving in the field of view of the imaging system. Each of the pixels in the image may have a grayscale value associated therewith, which grayscale value may have any suitable bit depth (e.g., 8 bits, 10 bits).

Figure 4:
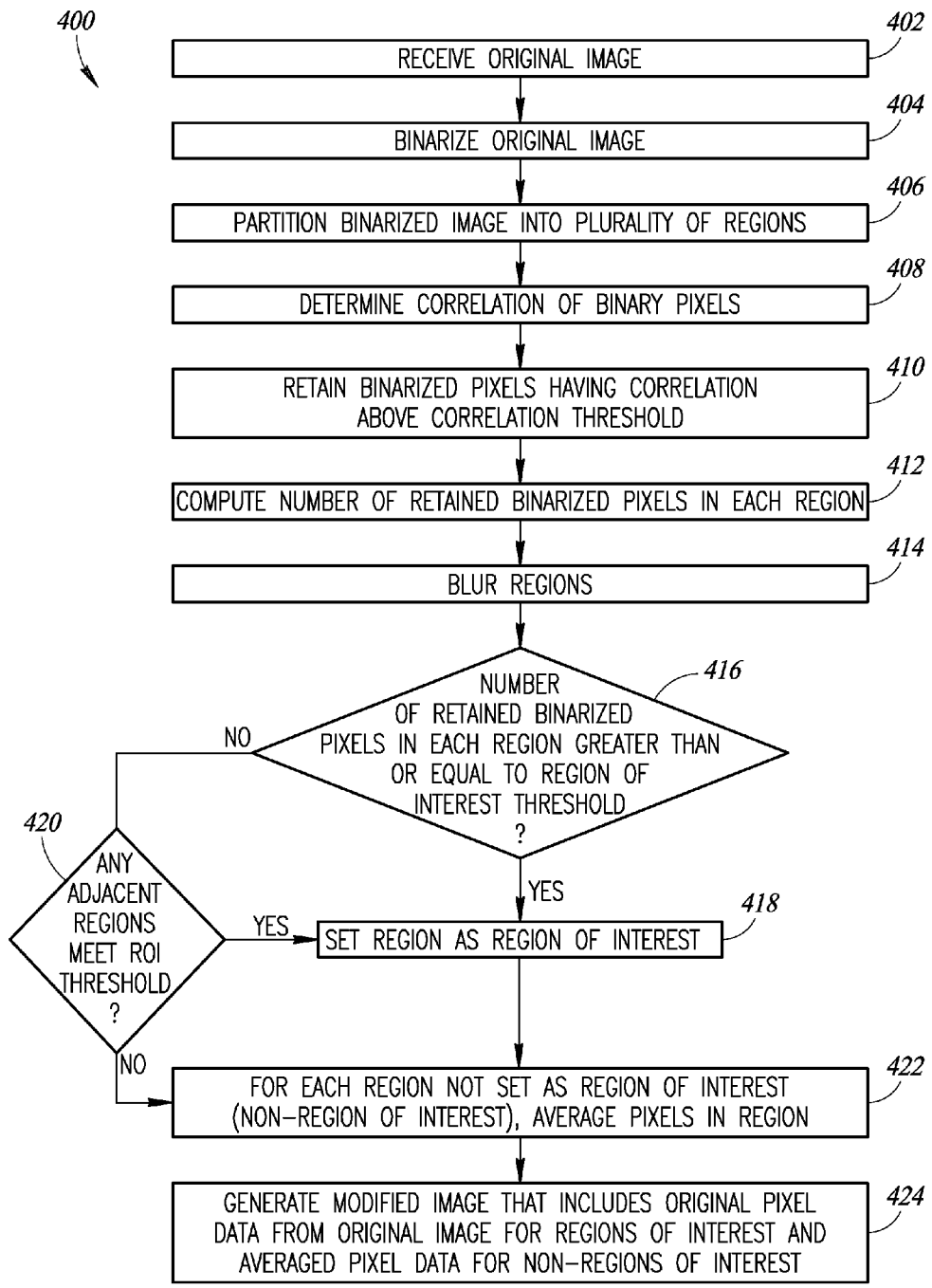
FIG. 4 is a flow diagram of a low-level method of operation for an image processor system, according to one illustrated implementation.

At 304, the at least one processor locates regions likely to include machine-readable symbol data, referred to as regions of interest (ROIs), in the original image. For example, the at least one processor, executing the ROI location logic may partition the original image into a plurality of two-dimensional regions each having a pixel width and height (e.g., 16×16 pixels, 20×12 pixels). The at least one processor may determine which of those regions are ROIs and which of those regions are non-ROIs. An exemplary method for locating ROIs in the original image is shown in FIG. 4 and discussed below.

At 306, the at least one processor computes an average pixel value for the pixels in each of the non-ROIs. For example, such may be achieved by, for each non-ROI, summing the grayscale values of each of the pixels in the non-ROI, and dividing the sum by the number of pixels in the non-ROI. Thus, all of the pixels in a particular non-ROI are represented by the same grayscale value.

At 308, the at least one processor generates a modified image which includes the original pixel values for each of the pixels located in an ROI, and the computed average pixel values for each of the pixels located in a non-ROI. Thus, the modified image retains the relatively high resolution of the original image for the ROIs and provides a relatively low resolution for the non-ROIs, which provides significant storage requirement savings for the modified image.

At 310, the at least one processor may send the modified image to a decoder which decodes the machine-readable symbol data present in the modified image.

Figure 7:
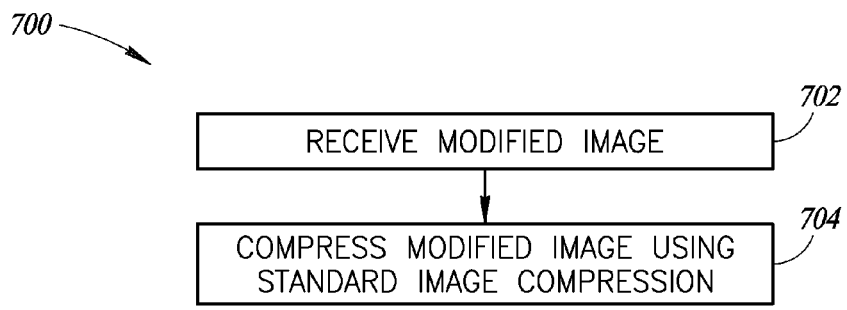
FIG. 7 is a flow diagram of a method of operation for an image processor system to compress an image, according to one illustrated implementation.
Figure 8:
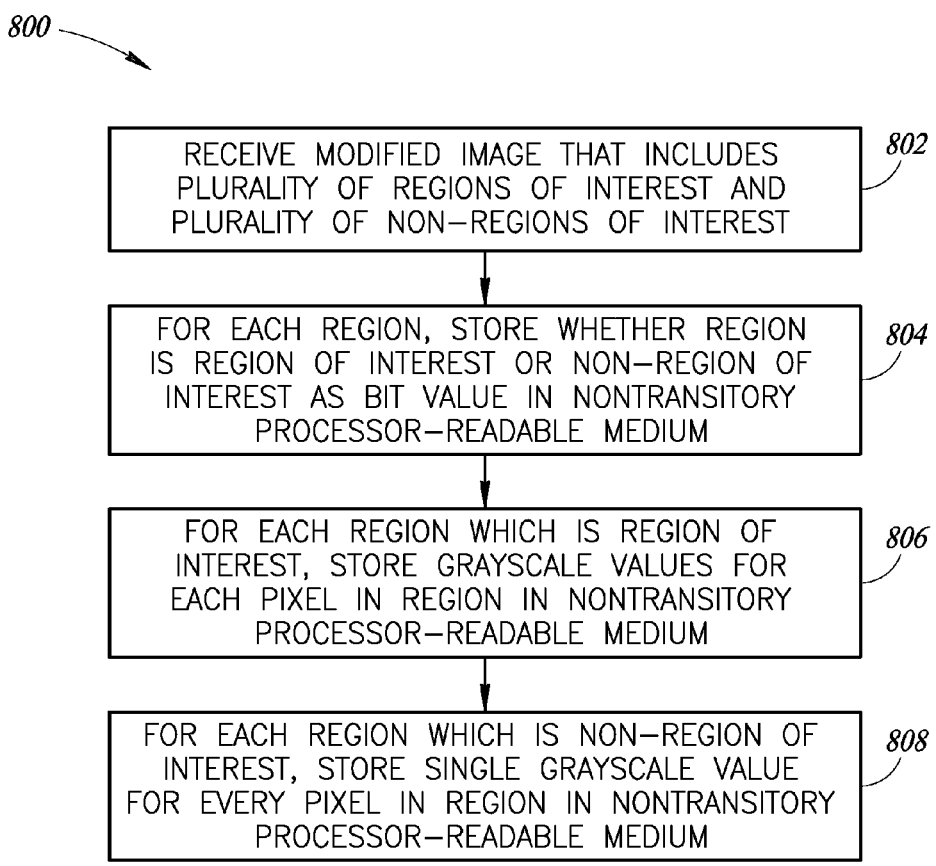
FIG. 8 is a flow diagram of a method of operation for an image processor system to compress an image, according to one illustrated implementation.

At 312, the at least one processor may compress the modified image using any number of compression algorithms. Since the non-ROIs are represented at a low resolution, compression algorithms may be able to provide much greater compression for the modified image compared to performing the same compression algorithm on the original image. Two compression algorithms are shown in FIGS. 7 and 8 and are discussed below.

At 314, the at least one processor may transmit the compressed modified image to an external processor-based device over a data communications channel. For example, the at least one processor may transmit the compressed modified image file to one or more processor-based devices over a wired and/or wireless LAN or WAN. Since the compressed modified image is much smaller in size than the original image, the reader may offload the modified image in substantially real time to one or more external devices for viewing, further processing, storage, etc. It is noted that in some implementations decoding may be performed internally, before compression, or externally, on the compressed image.

FIG. 4 is a flow diagram of a low-level method 400 of operation for an image processor system which facilitates improved decoding times and improved levels of compression. The method 400 may be executed by one or more processors of a machine-readable symbol reader, for example, such as the machine-readable symbol readers 100 and 200 of FIGS. 1 and 2, respectively, executing ROI location logic.

At 402, at least one processor receives an original image which captures at least one machine-readable symbol. For example, the at least one processor of the reader may receive the original image from an imaging subsystem of the reader, from a nontransitory processor-readable medium of the reader or from another processor-based device communicably coupled to the reader. The original image may include a two dimensional array of pixels, such as an array having a width of 8192 pixels and a height of 8192 pixels, which provides a total of 67,108,864 pixels. Each of the pixels in the image may have a grayscale value associated therewith, which grayscale value may have any suitable bit depth (e.g., 8 bits, 10 bits).

At 404, the at least one processor binarizes the original image to create a binarized image. In some implementations, the at least one processor may utilize a binarization algorithm which is a hardware implemented edge detector that accurately detects edges within the original image over a wide range of image quality. In some implementations, pixels which are classified as an edge have the LSB of their grayscale value set to 0, while any pixels not classified as an edge have the LSB of their grayscale value set to 1.

In some implementations, the binarization algorithm utilizes a sliding window (e.g., an 8×8 pixel window) which passes over every pixel in the image. For each pixel under evaluation, all of the pixels in the window are summed, and the darkest and brightest pixel values are stored. This total summation is then recomputed as:

total=(total−(total/16.0)/64.0)

If the value of the pixel being evaluated is greater than "total," or if the difference between the brightest pixel and the darkest pixel in the window is less than a value (e.g., 32), then the LSB of the grayscale value of the pixel being evaluated is set to 0, indicating the pixel under evaluation is an edge. Otherwise, the LSB of the grayscale value of the pixel being evaluated is set to 1, indicating the pixel under evaluation is not an edge. This LSB may be referred to as the pixel's "binarized state" or "binarization state," which signifies whether the pixel is classified as an "edge" or a "non-edge." It should be appreciated that other binarization algorithms may be utilized. Generally, the inventor of the present disclosure has found that the number of pixels classified as edges in a given region is higher when machine-readable symbols or textual data are present.

At 406, the at least one processor partitions the binarized image into a plurality of regions. For example, the at least one processor may partition the original image into a plurality of two-dimensional regions each having a pixel width of 16 pixels and a pixel height of 16 pixels. Other dimensions for the regions may also be utilized.

Figure 5:
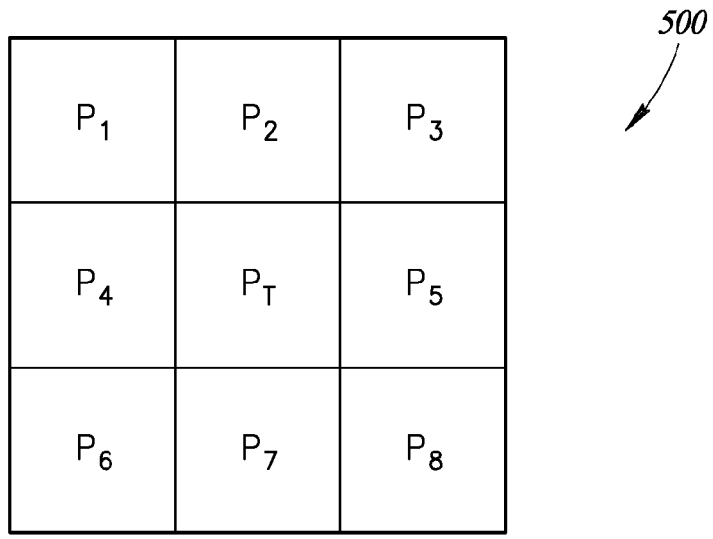
FIG. 5 is a diagram depicting a target pixel of an image and a plurality of neighboring pixels surrounding the target pixel, according to one illustrated implementation.

At 408, the at least one processor determines a correlation for each of the pixels in the binarized image. In some implementations, each pixel is correlated by counting the binarization of the immediate eight neighbors of the pixel under consideration ("target pixel"). For example, FIG. 5 shows an example 3×3 pixel region 500 of nine pixels, namely, pixels $P_{1-8}$ and $P_T$. For a target pixel $P_T$ under consideration, the correlation algorithm may consider the binarization of the eight immediate neighboring pixels $P_{1-8}$ of the target pixel $P_T$.

In some implementations, the counting process also considers pixels in surrounding regions to accommodate target pixels located on region boundaries. For example, if the target pixel $P_T$ of FIG. 5 were adjacent a region boundary (e.g., a lower boundary), the counting process may still consider pixels $P_{1-8}$ although some (e.g., pixels $P_{6-8}$) of the pixels $P_{1-8}$ may be outside the region in which the target pixel $P_T$ is located. In some implementations, the counting process considers pixels in surrounding regions in all cases except when the target pixel is at the actual image boundary.

At 410, binarized pixels which have at least a correlation threshold ('x') of binarized neighbors get counted or retained as "correlated pixels." For example, if x=0, then all binarized pixels would be counted or retained as correlated pixels. If x>8, then no binarized pixels would be counted as correlated pixels. Setting the correlation threshold x=2 ensures that marginally binarized symbols (e.g., width of one pixel) would be counted. In such instances, only single binarized pixels or pairs of binarized pixels would be suppressed. However, such a low correlation threshold is not often needed.

For example, even at 1.4 pixels per module (PPM), a single module (e.g., a bar of a barcode) is at least two binarized pixels wide. Thus, most pixels on narrow modules will have 5 binarized pixel neighbors. For example, the target pixel $P_T$ may have binarized neighbors $P_1$, $P_2$, $P_4$, $P_6$ and $P_7$, for a vertically oriented bar module or may have binarized neighbors $P_1$, $P_2$, $P_3$, $P_4$, and $P_5$ for a horizontally oriented bar module.

In some implementations, the correlation threshold may be set to 5, which has been found to be effective at suppressing non-machine-readable symbol artifacts, such as wood grain found on some tilt-tray systems.

Other methods may be used to test for correlation. For example, modules in a given region may produce very bright bin values when a Hough Transform is calculated. Similarly, neighboring regions may have their respective Hough Transform compared as well. Other correlations may also be used.

Figure 6:
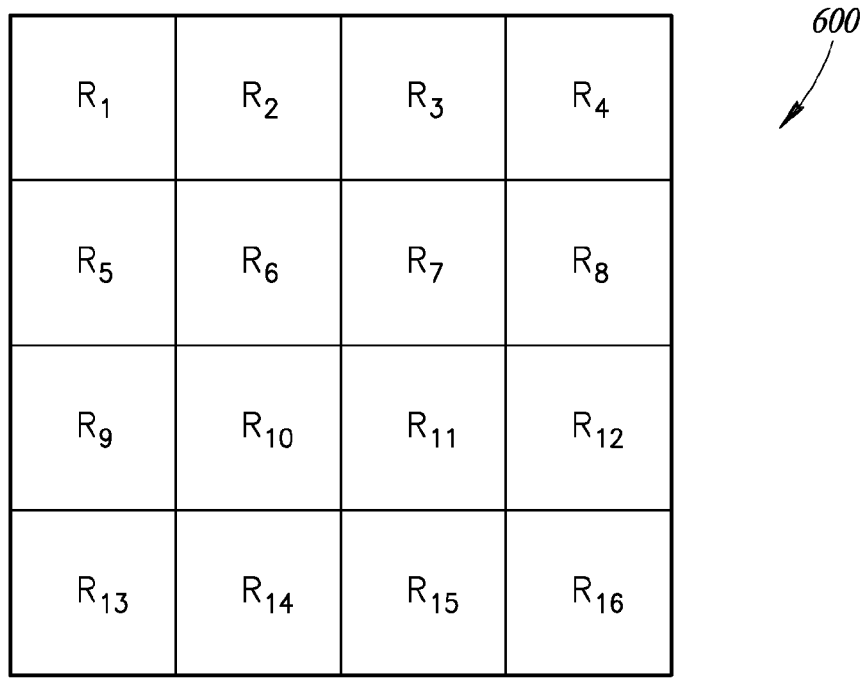
FIG. 6 is a diagram depicting a plurality of regions of pixels of an image, according to one illustrated implementation.

At 412, the at least one processor computes or counts the number of correlated binarized pixels in each region of the image. For example, FIG. 6 shows a group 600 of regions $R_{1-16}$ for an example image. In the case where each of the regions $R_{1-16}$ has a dimension of 16×16 pixels, each of the regions comprises 256 pixels of the original image. The at least one processor may count the number (between 0 and 256) of correlated binarized pixels in each of the regions $R_{1-16}$. Thus, each region may be represented by a number, referred to herein as a region correlation value, which creates a two dimensional array of region correlation values, referred to herein as a region correlation array. Each of the region correlation values may be indicative of the number of correlated pixels in each corresponding region.

Optionally, at 414 the calculated regions are convolved (blurred) using 3×3 averaging. In some implementations wherein the regions are calculated row by row, after each three rows of the regions have been calculated, the rows of regions are convolved "on the fly" using 3×3 averaging in substantially real time. This blurring operation may make masses of regions which form machine-readable symbols appear more uniform while at the same time lowering the value of small groups of ROIs which may make up object edges, scuff marks, etc. As indicated above, in some implementations the blurring or smoothing act 414 may be omitted.

At 416, after correlation and optional blurring, the at least one processor determines, for each region, whether the number of retained binarized pixels in each region is greater than or equal to a region of interest threshold ("ROI threshold"). At 418, if the number of retained binarized pixels in a region is greater than or equal to the ROI threshold (i.e., 416='yes'), the at least one processor sets or identifies the region as a ROI.

At 420, if the number of retained binarized pixels in a region is less than the ROI threshold (i.e., 416='no'), the at least one processor may determine, for each such region, whether any of the regions immediately adjacent the region meet the ROI threshold. For regions which have immediately adjacent regions which meet the ROI threshold (i.e., 420='yes'), the at least one processor sets or identifies such regions as ROIs. For example, if the region $R_6$ of FIG. 6 is determined to not meet the ROI threshold, the region $R_6$ may still be identified as an ROI if any of the adjacent eight regions $R_1$, $R_2$, $R_3$, $R_5$, $R_7$, $R_9$, $R_{10}$, and $R_{11}$ meet the ROI threshold. This feature may be used to handle boundary conditions where a particular region at a boundary of a machine-readable symbol may include only a single bar (e.g., the first bar) of the machine-readable symbol and thus may fall below the ROI threshold. In this example, the criteria for making a region an ROI if the region does not pass the ROI threshold is to determine if any of the region's eight immediate neighbors exceeds the ROI threshold (not just marked as valid). If such is true, then the region in question is also considered an ROI. It is noted that the act 420 is not a mandatory. For example, in some implementations, such act may be implemented by an external decoder after the determined ROIs are transmitted to another component or system.

At 422, for each of the regions not determined to be an ROI ("non-ROI regions"), the at least one processor may compute an average pixel value for the all of the pixels in the non-ROI. For example, such may be achieved by, for each non-ROI, summing the grayscale values of each of the 256 pixels in the non-ROI, and dividing the sum by 256 (i.e., the number of pixels in the non-ROI). Thus, all of the pixels in a particular non-ROI are represented by a single grayscale value.

At 424, the at least one processor may generate a modified image which includes original pixel data from the original image for the pixels in the ROIs and includes the averaged pixel values for pixels in the non-ROIs.

In some implementations, when the correlation threshold is set to 5, the ROI threshold may be set to a value that is at least 30 to suppress the majority of unwanted artifacts. In some implementations, the ROI threshold may be set to 40, 60 or higher.

FIG. 7 is a flow diagram of a method 700 of operation for an image processor system to compress an image. At 702, at least one processor of a processor-based device, such as the machine-readable symbol readers 100 and 200 of FIGS. 1 and 2, respectively, receives a modified image. The modified image may be modified utilizing the region of interest location methods 300 or 400 of FIGS. 3 and 4, respectively.

At 704, the at least one processor may compress the modified image using a standard image compression technology. For example, the at least one processor may compress the modified image using JPEG compression. Since the modified image includes numerous non-ROIs which each have a number (e.g., 256) of pixels set to the same value, the standard image compression algorithm is able to generate a highly compressed image compared to compressing the original image which has not been modified using the methods described above.

Figure 9:
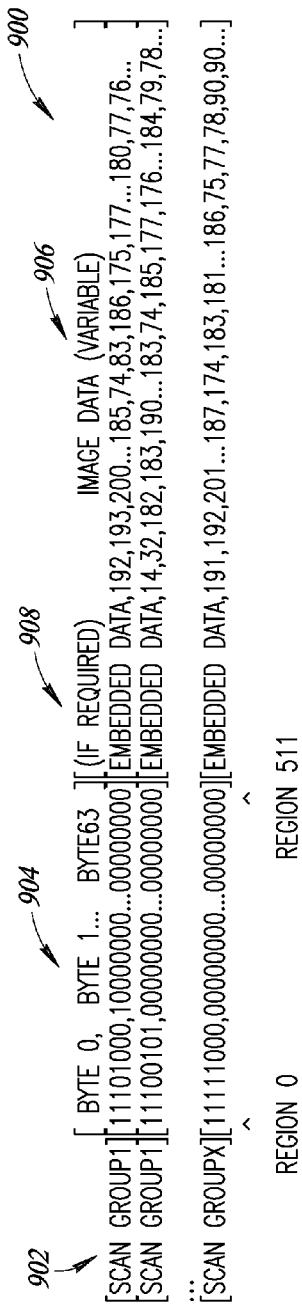
FIG. 9 is a diagram depicting an example data structure generated using the method FIG. 8, according to one illustrated implementation.

FIG. 8 is a flow diagram of a method 800 of operation for an image processor system to compress an image. FIG. 9 provides an illustrative example of a data structure 900 generated using the compression method 800 of FIG. 8. At 802, at least one processor of a processor-based device, such as the machine-readable symbol reader 100 and 200 of FIGS. 1 and 2, respectively, receives a modified image. The modified image may be modified utilizing the region of interest location methods 300 or 400 of FIGS. 3 and 4, respectively. The modified image includes a plurality of ROIs and a plurality of non-ROIs. As discussed above, each of the pixels in the ROIs retain their original grayscale values, while each of the pixels in a non-ROI have a value which is the average pixel value for all the pixel values of the particular non-ROI.

At 804, the at least one processor stores whether each region of an image is an ROI or a non-ROI as a bit value in a nontransitory processor-readable medium. For example, an 8192 pixels wide image contains a plurality of rows, each row comprising 512 16×16 pixel regions. Thus, a series of 512 bits (i.e., 64 bytes) may be used to indicate which regions in a row of regions are ROIs and which regions are non-ROIs. As shown in FIG. 9, for each of X scan groups 902, bytes 0 to 63 are used as a preamble 904 to indicate whether each of the regions 0 to 511 are ROIs or non-ROIs.

Following the preamble 904 is the grayscale data 906 associated with each of the regions 0 to 511. At 806, if the bit in the 64-byte field is 1, then the corresponding region is an ROI, and all of the 256 grayscale values for the 256 pixels in the region are used to define the pixels in the region. At 808, if the bit in the 64-byte field is 0, then the corresponding region is a non-ROI and a single grayscale value is used to define all of the pixels in the region. In some implementations, the first N (e.g., 3) bits of byte 0 may be set to 1 so embedded data 908 is preserved.

For regions having a height of 16 pixels, this process may continue for every 16 scan lines acquired by the machine-readable symbol reader. In some implementations, the generated stream of data may be sent to the decoder as is and transmitted out of the reader to an external processor-based device. A receiving processor-based device may utilize an appropriately configured decompression algorithm to form the modified image. This method provides excellent compression with lossless preservation of the pixel data in the ROIs.

FIGS. 10-17 show various illustrations for a method of detecting text and/or machine-readable symbols in images. The method may be implemented in a machine-readable symbol reader or another suitable processor-based device. The method discriminates between one-dimensional machine-readable symbols, two-dimensional machine-readable symbols, and text. The method also provides an orientation angle for one-dimensional machine-readable symbols (e.g., barcodes). Generally, the method makes decisions based solely on statistical distributions of binarized pixels. The method does not analyze or utilize grayscale values, yet the method still provides excellent discriminatory ability.

Prior to referencing FIGS. 10-17, a general description of the method is provided. At least one processor analyzes 3×3 pixel regions across an entire image to determine the exact pattern of binarized pixels in the image. Each pattern may be assigned a value (e.g., 0-511) depending on which pixels in the 3×3 region are binarized.

A well-designed look-up table with 512 entries utilizes the pattern value of the region as an index into the look-up table. The output of the look-up table may be a directional value between −1 and 8, with values of 0 to 7 indicating directions, a value of −1 indicating that no discernable direction exists, and a value of 8 indicating multiple directions exist.

The at least one processor may create a vector image or vector map using the outputs from the look-up table. Such image may be divided into blocks (e.g., 16×16 blocks). Within each block, the at least one processor may build a histogram of directions (i.e., the look-up table outputs). This histogram may be analyzed for the mode of the histogram.

The method discussed below may be implemented as a relatively sophisticated correlation scheme. Further, careful design of the look-up table allows this method to be used as a powerful feature identification/extraction tool.

Figure 10:
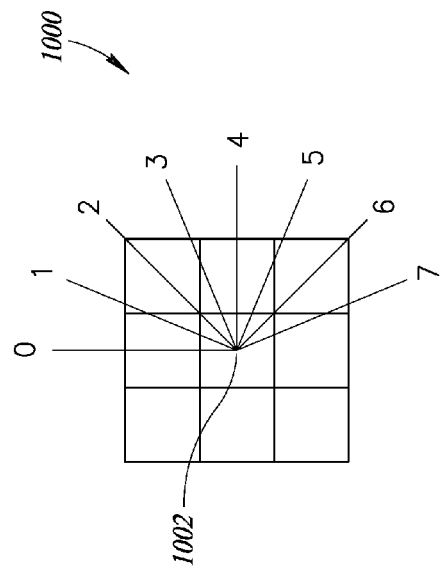
FIG. 10 is a diagram depicting directional values for a 3×3 region of pixels, according to one illustrated implementation.

Referring now to FIG. 10, a diagram depicting directional values for a 3×3 region 1000 of pixels 1002 is shown. As shown, there are 8 possible directions (0-7) which can be assigned based upon pixel configuration. A value of −1 indicates no direction, and a value of 8 indicates multiple directions. The angular distance between each of the directions is 22.5 degrees.

Figure 11:
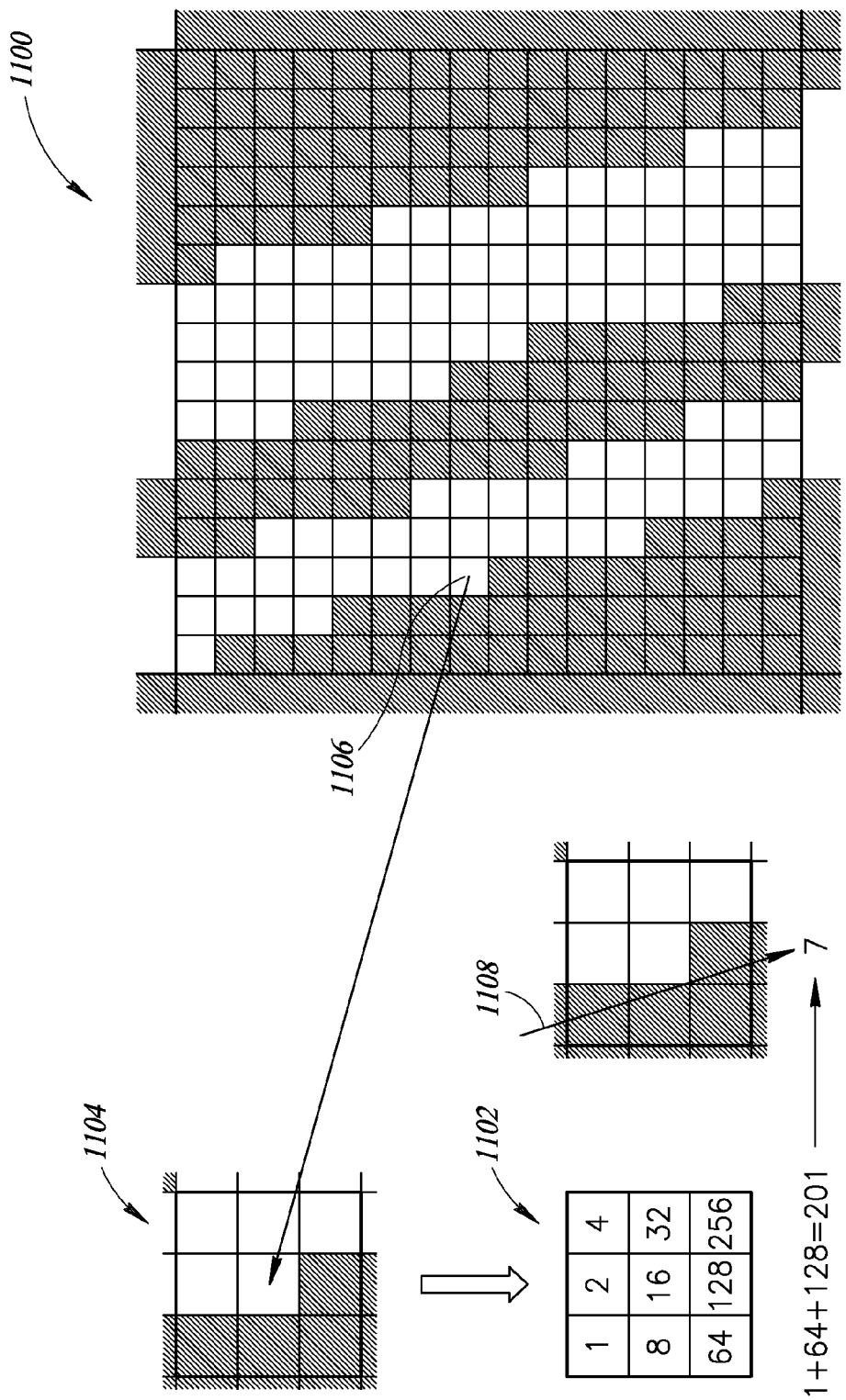
FIG. 11 is a diagram depicting pattern values for a 3×3 region of pixels, according to one illustrated implementation.

FIG. 11 is a diagram 1100 depicting pattern values 1102 for a 3×3 region 1104 of pixels centered on a target pixel 1106. As shown, each 16×16 pixel region will have 256 pattern values. In this example, the pixels in the top row of the 3×3 region 1104 are assigned values of 1, 2 and 4 from left to right. The pixels in the middle row of the 3×3 region are assigned values 8, 16 and 32 from left to right. The pixels in the bottom row are assigned values of 64, 128 and 256 from left to right. In this example, the 3×3 region 1104 surrounding the target pixel 1106 is assigned a value of 201 based on which of the pixels surrounding the target pixel are high (e.g., 1). As discussed further below, the value 201 may be mapped via a look-up table to the directional value of 7, as indicated by an arrow 1108. It is noted that parallel lines may only contain a few possible shapes.

The result of calculating the pattern values is a vector map or vector image. That is, the pixel values for the image are a function of the respective vector which the pixels represent.

Figure 12:
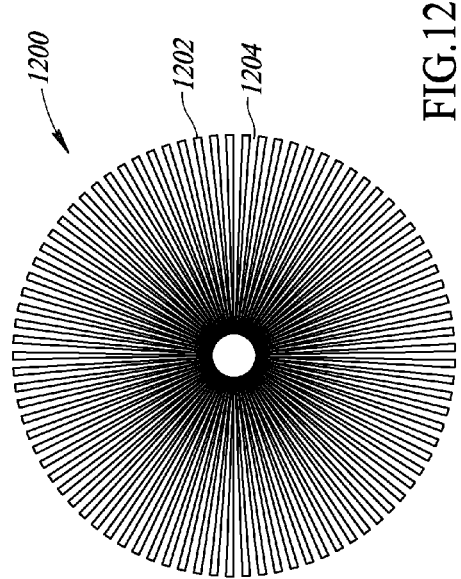
FIG. 12 is a diagram depicting a look up table calibration pattern, according to one illustrated implementation.

FIG. 12 is a diagram depicting a star-shaped look up table calibration pattern 1200. In this example, the minimum angle of resolution is 22.5*(1/16)=1.4 degrees. Thus, the pattern 1200 comprises a star pattern with spokes 1202 which are 1.4 degrees wide and which are spaced apart from each other by 1.4 degree gaps 1204. Generally, a histogram of the calibration pattern 1200 should be as flat as possible across directions 0 to 7.

Figure 13:
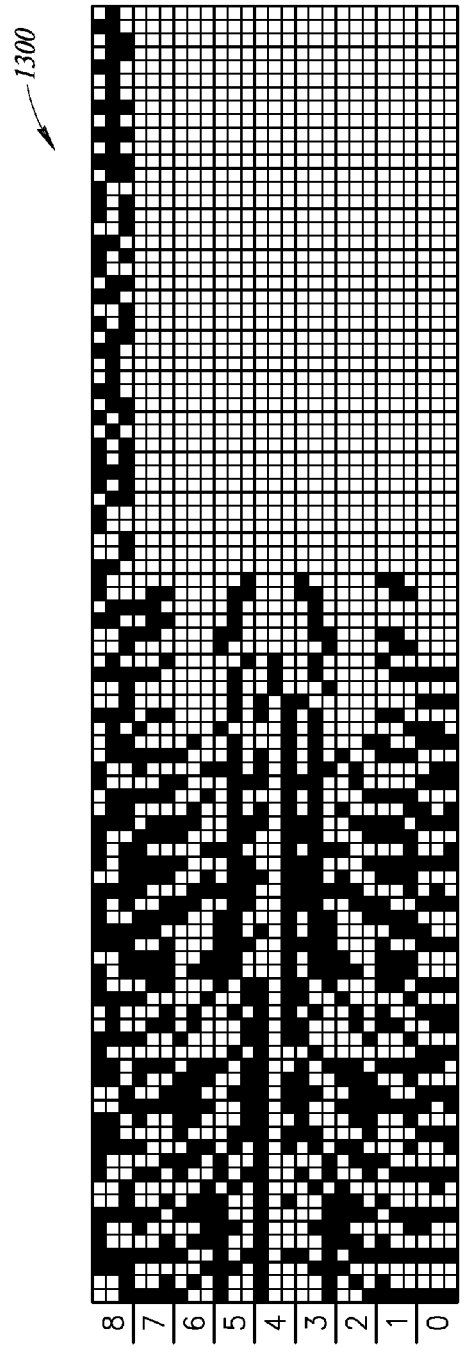
FIG. 13 is a diagram depicting a bitmap which implements a look up table, according to one illustrated implementation.

FIG. 13 is a diagram depicting a bitmap 1300 which implements a look up table. The bitmap 1300 contains rows of 3×3 regions of pixel configurations for all possible directions 0 to 7. The layout of these pixel configurations may be modified to achieve the flattest direction response possible when applied to the "star" calibration pattern 1200 FIG. 12.

Figure 14:
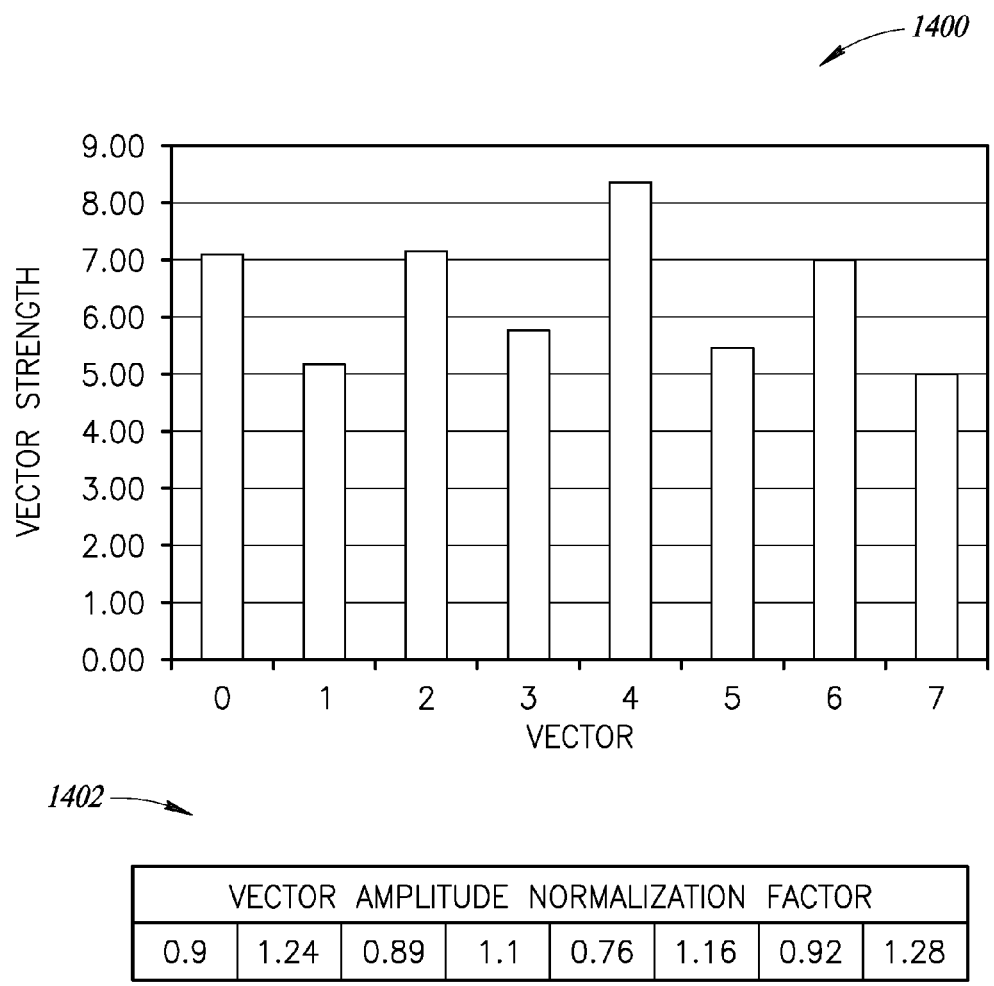
FIG. 14 is a diagram of a calibration target response graph, according to one illustrated implementation.

FIG. 14 is a diagram of a calibration target response graph 1400, which shows the response of the look-up table 1300 of FIG. 13 to the star calibration pattern 1200 of FIG. 12 for directions 0-7. In some implementations, vector amplitude normalization factors 1402 may be computed to correct for irregularities in the look-up table response. These normalization factors 1402 may be applied to measured vector histograms. Ideally, all of the normalization factors would be equal to 1.

Figure 15:
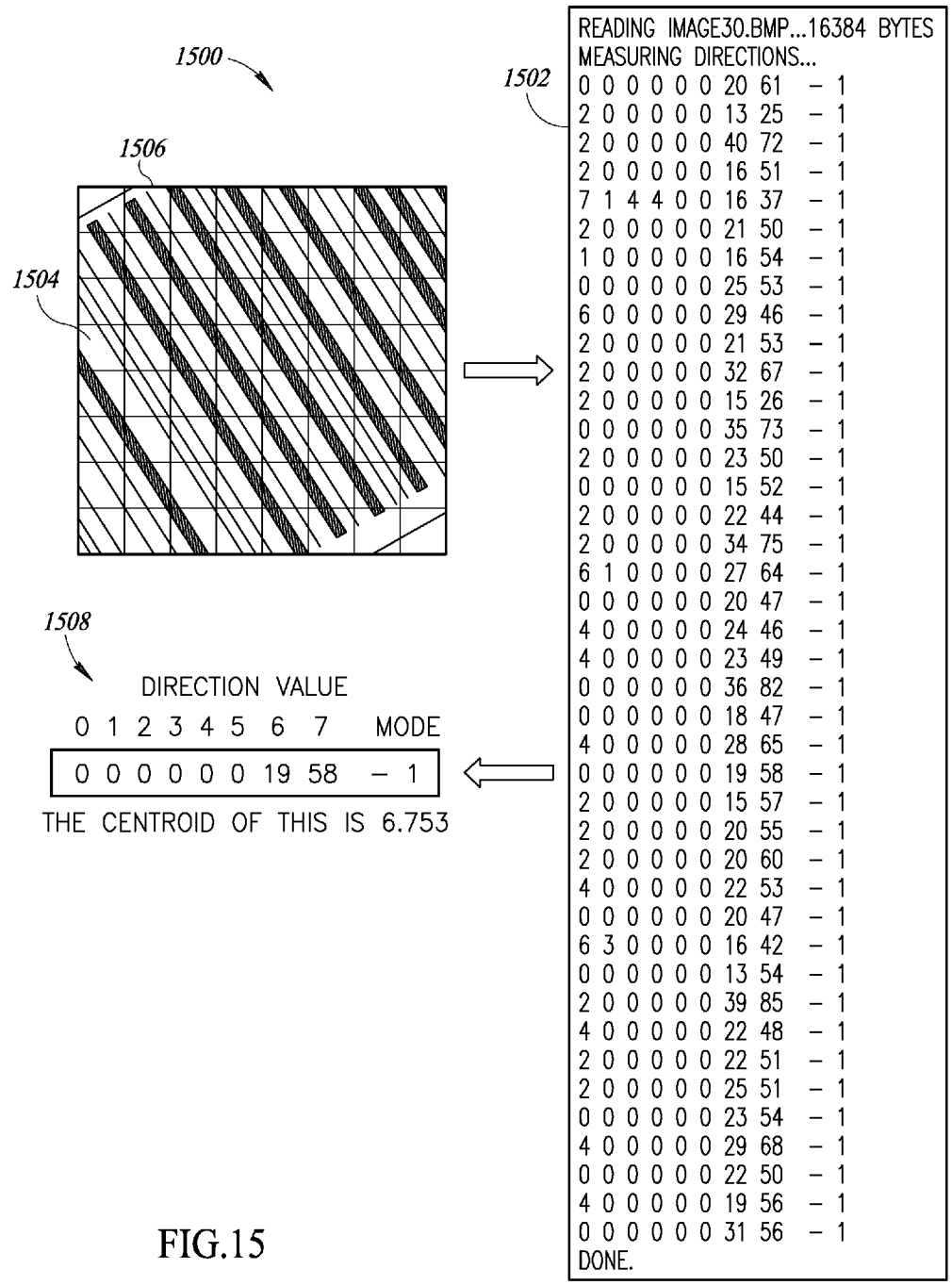
FIG. 15 is a diagram depicting an angle calculation histogram for a plurality of regions of an image, according to one illustrated implementation.

FIG. 15 is a diagram 1500 depicting an angle calculation histogram table 1502 for a plurality of regions 1504 of an image 1506 which depicts an angled one-dimensional barcode. As shown, each of the regions 1504 produces a histogram. In this example, every histogram in the histogram table 1502 is single mode with a centroid between 6 and 7. For example, the directional values of one of the regions is shown at arrow 1508 as having a centroid of 6.753, which corresponds to an angle calculation of 152 degrees (i.e., 6.753 directional value multiplied by 22.5 degrees per directional value=152 degrees).

Figure 16:
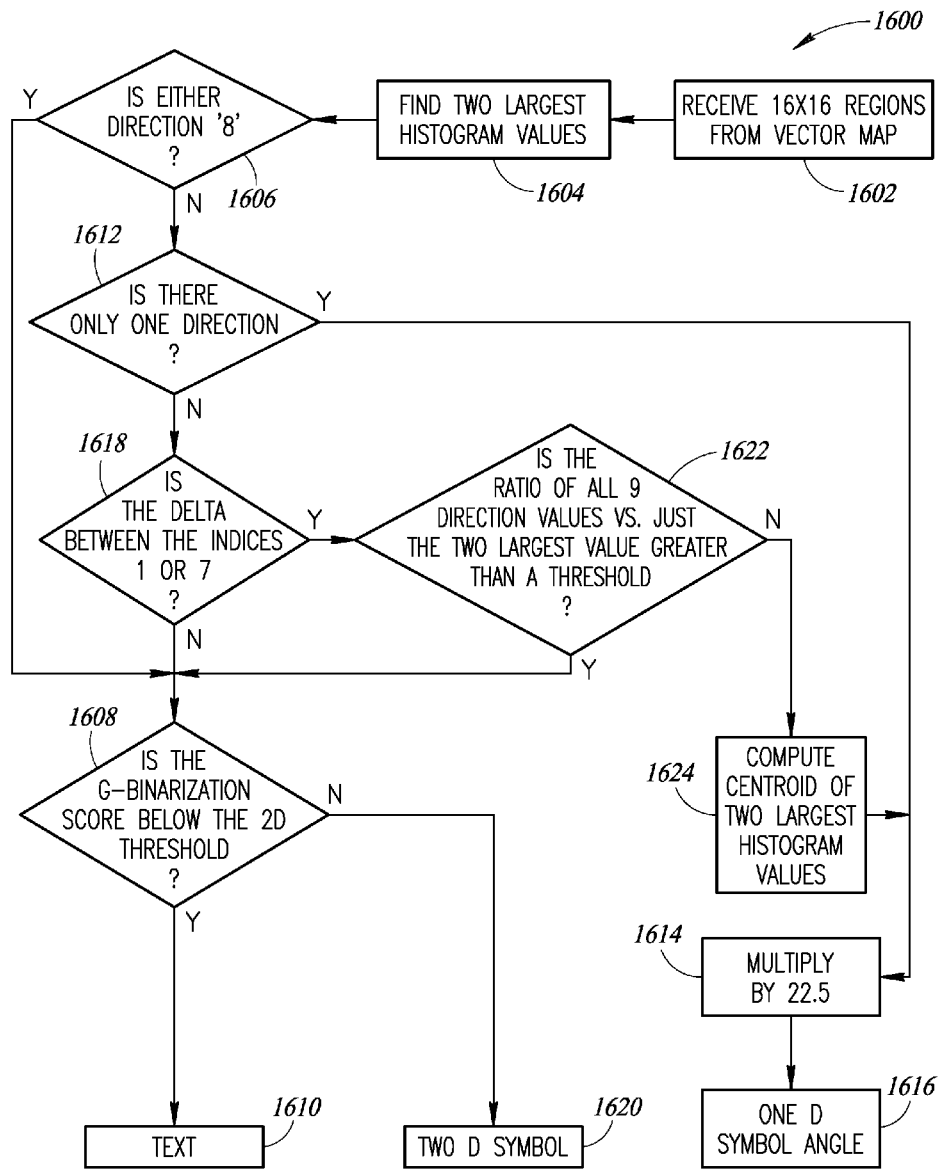
FIG. 16 is a flow diagram of a method of operation for an image processor system to detect text, a one-dimensional machine-readable symbol and a two dimensional machine-readable symbol in an image, according to one illustrated implementation.

FIG. 16 is a flow diagram of a method 1600 of operation for an image processor system to detect text, one-dimensional machine-readable symbols and two dimensional machine-readable symbols in an image. In operation, the method 1600 may analyze the histograms discussed above.

At 1602, at least one processor may receive the 16×16 regions from the vector map, as discussed above. At 1604, the at least one processor finds the two largest histogram values.

At 1606, the at least one processor determines whether either of the two largest histogram values is equal to the directional value 8. As noted above, the directional value of 8 is reserved for 3×3 pixel configurations which have multiple directions. If either of the two largest histogram values is equal to 8 (i.e., 1606="yes"), then at 1608 the at least one processor determines whether a binarization score is below a two-dimensional binarization threshold (e.g., 80). If the binarization score is below the two dimensional binarization threshold (i.e., 1608="yes"), the at least one processor determines the region includes text at 1610. If the binarization score is not below the two-dimensional binarization threshold (i.e., 1608="no"), the at least one processor determines the region includes a two-dimensional machine-readable symbol at 1620.

If neither of the two largest histogram values are equal to 8 (i.e., 1606="no"), then at 1612 the at least one processor determines if there is only one direction present. If there is only one direction present, the at least one processor determines that a one-dimensional machine-readable symbol is present. At 1614, the at least one processor multiplies the directional value (i.e., 0 to 7) by 22.5 degrees to obtain the angle for the one-dimensional machine-readable symbol at 1616.

If there is more than one direction present (i.e., 1612="no"), the at least one processor then determines whether the delta between the indices is 1 or 7 at 1618. If the delta between the indices is 1 or 7, then at 1608 the at least one processor determines whether a binarization score is below a two-dimensional binarization threshold (e.g., 80). If the binarization score is below the two dimensional binarization threshold (i.e., 1608="yes"), the at least one processor determines the region includes text at 1610. If the binarization score is not below the two-dimensional binarization threshold (i.e., 1608="no"), the at least one processor determines the region includes a two-dimensional machine-readable symbol at 1620.

If the delta between the indices is not 1 or 7 (i.e., 1618="no"), then the at least one processor determines whether the ratio of all 9 directional values versus just the two largest directional values is greater than a threshold (e.g., 0.2) at 1622. If so (i.e., 1622="yes"), then control passes to decision act 1608.

If the ratio of all 9 directional values versus just the two largest directional values is not greater than a threshold (i.e., 1622="no"), then the at least one processor computes the centroid of the two largest histogram values at 1624. At 1614, the result is multiplied by 22.5 degrees to obtain the one dimensional machine-readable symbol angle value at 1616.

As discussed above, the systems and methods of the present disclosure provide an effective method for identifying valid machine-readable symbol regions of interest in real time, thereby removing this burden from a decode engine and greatly improving process times. This same procedure also provides a substantial benefit for image transmission, which can be a serious bottleneck for current machine-readable symbol reader designs. Further, the systems and methods disclosed herein may be particularly well suited for implementation on a field programmable gate array (FPGA).

The region of interest location methodology and compression methodology discussed herein may not necessarily be coupled together. For example, the region of interest location methodology may be used to improve decoding and the unprocessed image data may be passed through to be used for other applications, such as video coding, for example.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including U.S. patent application titled "SYSTEM AND METHOD FOR READING MACHINE READABLE CODES IN TRANSPORTATION AND LOGISTIC APPLICATIONS," filed on May 29, 2015, are incorporated herein by reference, in their entirety. Aspects of the implementations can be modified, if necessary, to employ systems, circuits and concepts of the various patents, applications and publications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of operation for an image processor system, the method comprising:

receiving, by at least one processor, an original image file from at least one nontransitory processor-readable medium, the original image file comprising a two dimensional array of pixels, each of the pixels having an original pixel value;

partitioning, by the at least one processor, the original image file into a plurality of two dimensional regions, each of the plurality of regions comprising a two dimensional array of the pixels;

binarizing, by the at least one processor, the original image file to generate a binarized image file comprising a two dimensional array of binarized pixels, each of the binarized pixels having a binarized pixel value;

correlating, by the at least one processor, each of the binarized pixels in the binarized image file by, for each binarized pixel, evaluating a binarization state of eight immediately neighboring pixels of the binarized pixel;

identifying, by the at least one processor, which of the binarized pixels in the binarized image have a correlation value above a correlation threshold, the correlation value of each binarized pixel comprising a count of the binarization state of the eight immediately neighboring pixels of the binarized pixel;

generating, by the at least one processor, a region correlation array comprising a plurality of region correlation values, each region correlation value corresponding to one of the plurality of regions and indicative of the number of binarized pixels in the corresponding region identified as having a correlation value above the correlation threshold;

for each region, comparing, by the at least one processor, the region correlation value with a region of interest threshold; and identifying, by the at least one processor, the region as a region of interest if the region correlation value is above the region of interest threshold.

2. The method of claim 1 wherein binarizing the original image file comprises implementing an edge detection algorithm to generate a binarized image file comprising a two dimensional array of binarized pixels, each of the binarized pixels having a binarized pixel value indicative of whether the binarized pixel has been classified as an edge by the edge detection algorithm.

3. The method of claim 1, further comprising:
blurring, by the at least one processor, the region correlation array using a convolution operation to generate a blurred region correlation array comprising a plurality of blurred region correlation values;
wherein, for each region,
comparing the region correlation value with a region of interest threshold comprises comparing the blurred region correlation value with a region of interest threshold; and
identifying the region as a region of interest if the region correlation value is above the region of interest threshold comprises identifying the region as a region of interest if the blurred region correlation value is above the region of interest threshold.

4. The method of claim 1, further comprising:
responsive to identifying the region as a region of interest, identifying, by the at least one processor, each region adjacent the region as a region of interest.

5. The method of claim 1, further comprising:
computing, by the at least one processor, a region average pixel value for each of a plurality of non-regions of interest, each non-region of interest being one of the regions of the original image file not identified as a region of interest;
for each pixel in a non-region of interest, setting, by the at least one processor, the pixel value to the computed region average pixel value for the region of which the pixel is a part to generate a modified image file; and
storing, by the at least one processor, the modified image file in the at least one nontransitory processor-readable medium.

6. The method of claim 5, further comprising:
sending, by the at least one processor, the modified image file to a decoder for decoding of the modified image file.

7. The method of claim 5, further comprising:
decoding, by the at least one processor, the modified image file.

8. The method of claim 5, further comprising:
compressing, by the at least one processor, the modified image file to generate a compressed modified image file.

9. The method of claim 8, further comprising:
sending, by the at least one processor, the compressed modified image file to a processor-based device over at least one data communication channel.

10. The method of claim 8 wherein compressing the modified image file comprises, for each non-region of interest of the original image file, storing, by the at least one processor, a single pixel value for all of the pixels in the non-region of interest.

11. An image processor system, comprising:
at least one processor;
at least one nontransitory processor-readable storage medium operatively coupled to the at least one processor which stores an original image file comprising a two dimensional array of pixels, each of the pixels having an original pixel value, the at least one non-transitory processor-readable medium further storing at least one of data or instructions which, when executed by the at least one processor, cause the at least one processor to:
partition the original image file into a plurality of two dimensional regions, each of the plurality of regions comprising a two dimensional array of the pixels;
identify one or more regions of interest in the original image file, the one or more regions of interest comprising one or more regions wherein data of interest are likely to be found;
compute a region average pixel value for each of a plurality of non-regions of interest, each non-region of interest being one of the regions of the original image file not identified as a region of interest;
for each pixel in a non-region of interest, set the pixel value to the computed region average pixel value for the region of which the pixel is a part to generate a modified image file; and
store the modified image file in the at least one nontransitory processor-readable medium,
wherein to identify the one or more regions of interest the at least one processor:
binarizes the original image file to generate a binarized image file comprising a two dimensional array of binarized pixels, each of the binarized pixels having a binarized pixel value;
correlates each of the binarized pixels;
identifies which of the binarized pixels have a correlation value above a correlation threshold; and
generates a region correlation array comprising a plurality of region correlation values, each region correlation value corresponding to one of the plurality of regions and indicative of the number of binarized pixels in the corresponding region identified as having a correlation value above the correlation threshold; and
blurs the region correlation array using a convolution operation to generate a blurred region correlation array of blurred region correlation values.

12. The image processor system of claim 11 wherein the at least one processor:
for each of the binarized pixels, evaluates a binarization state of at least one neighboring pixel to correlate the binarized pixel.

13. The image processor system of claim 11 wherein the at least one processor:
for each region:
compares the region correlation value with a region of interest threshold; and
identifies the region as a region of interest if the region correlation value is above the region of interest threshold.

14. The image processor system of claim 13 wherein the at least one processor:
for each region in which the region correlation value is above the region of interest threshold, identifies each region adjacent the region as a region of interest.

15. The image processor system of claim 11 wherein the data of interest comprises at least one of text or a machine-readable symbol.

16. The image processor system of claim 11 wherein the at least one processor:
sends the modified image file to a decoder for decoding of the data of interest present in the modified image file.

17. The image processor system of claim 11 wherein the at least one processor:

decodes the data of interest present in the modified image file.

18. The image processor system of claim 11 wherein the at least one processor:
compresses the modified image file to generate a compressed modified image file.

19. The image processor system of claim 18 wherein the at least one processor:
sends the compressed modified image file to a processor-based device over at least one data communication channel.

20. The image processor system of claim 18 wherein the at least one processor:
for each non-region of interest of the original image file, stores a single pixel value for all of the pixels in the non-region of interest.

21. The image processor system of claim 11 wherein the at least one processor:
sends the modified image file to a processor-based device via at least one data communication channel.

22. A method of operation for an image processor system, the method comprising:
receiving, by at least one processor, an original image file from at least one nontransitory processor-readable medium, the original image file comprising a two dimensional array of pixels, each of the pixels having an original pixel value;
partitioning, by the at least one processor, the original image file into a plurality of two dimensional regions, each of the plurality of regions comprising a two dimensional array of the pixels;
identifying, by the at least one processor, one or more regions of interest in the original image file, the one or more regions of interest comprising one or more regions wherein data of interest are likely to be found;
computing, by the at least one processor, a region average pixel value for each of a plurality of non-regions of interest, each non-region of interest being one of the regions of the original image file not identified as a region of interest;
for each pixel in a non-region of interest, setting, by the at least one processor, the pixel value to the computed region average pixel value for the region of which the pixel is a part to generate a modified image file; and
storing, by the at least one processor, the modified image file in the at least one nontransitory processor-readable medium,
wherein identifying one or more regions of interest in the original image file comprises:
binarizing, by the at least one processor, the original image file to generate a binarized image file comprising a two dimensional array of binarized pixels, each of the binarized pixels having a binarized pixel value;
correlating, by the at least one processor, each of the binarized pixels;
identifying, by the at least one processor, which of the binarized pixels have a correlation value above a correlation threshold;
generating, by the at least one processor, a region correlation array comprising a plurality of region correlation values, each region correlation value corresponding to one of the plurality of regions and indicative of the number of binarized pixels in the corresponding region identified as having a correlation value above the correlation threshold;
comparing, by the at least one processor, the region correlation value with a region of interest threshold;
identifying, by the at least one processor, the region as a region of interest if the region correlation value is above the region of interest threshold; and
for each region in which the region correlation value is above the region of interest threshold, identifying, by the at least one processor, each region adjacent the region as a region of interest.

23. The method of claim 22 wherein correlating each of the binarized pixels comprises, for each of the binarized pixels, evaluating, by the at least one processor, a binarization state of at least one neighboring pixel.

24. The method of claim 22 wherein identifying one or more regions of interest in the original image file comprises blurring, by the at least one processor, the region correlation array using a convolution operation to generate a blurred region correlation array of blurred region correlation values.

25. The method of claim 22 wherein identifying one or more regions of interest in the original image file comprises identifying, by the at least one processor, one or more regions of interest comprising one or more regions wherein data of interest are likely to be found, and the data of interest comprises at least one of text or a machine-readable symbol.

26. The method of claim 22, further comprising:
sending, by the at least one processor, the modified image file to a decoder for decoding of the data of interest present in the modified image file.

27. The method of claim 22, further comprising:
decoding, by the at least one processor, the data of interest present in the modified image file.

28. The method of claim 22, further comprising:
compressing, by the at least one processor, the modified image file to generate a compressed modified image file.

29. The method of claim 28, further comprising:
sending, by the at least one processor, the compressed modified image file to a processor-based device over at least one data communication channel.

30. The method of claim 28 wherein compressing the modified image file comprises, for each non-region of interest of the original image file, storing, by the at least one processor, a single pixel value for all of the pixels in the non-region of interest.

31. The method of claim 22, further comprising:
sending, by the at least one processor, the modified image file to a processor-based device via at least one data communication channel.

* * * * *